(12) United States Patent
Komatsu (10) Patent No.: US 7,868,767 B2
(45) Date of Patent: Jan. 11, 2011

(54) IC TAG (75) Inventor: Hirohide Komatsu, Yokohama (JP)

(73) Assignee: KRD Corporation, Kanagawa (JP)

( * ) Notice: Subject to any disclaimer, the term of this patent is extended or adjusted under 35 U.S.C. 154(b) by 138 days.

(21) Appl. No.: 11/361,963

(22) Filed: Feb. 27, 2006

(65) Prior Publication Data
US 2006/0273912 A1   Dec. 7, 2006

(30) Foreign Application Priority Data

Feb. 28, 2005   (JP)   ............................. 2005-053987

(51) Int. Cl.
G08B 13/14   (2006.01)
G06K 19/06   (2006.01)

(52) U.S. Cl. .................................. 340/572.8; 235/492

(58) Field of Classification Search .............. 340/572.8, 340/10.52, 572.01–572.07; 257/796; 235/492, 235/487
See application file for complete search history.

(56) References Cited

U.S. PATENT DOCUMENTS

| 3,100,804 | A | * | 8/1963 | Abramo ..................... 568/607 |
| 4,451,754 | A | * | 5/1984 | Stolz et al. ................... 310/348 |
| 5,378,880 | A | * | 1/1995 | Eberhardt ................... 235/439 |
| 5,859,587 | A | * | 1/1999 | Alicot et al. ............. 340/572.8 |
| 6,215,401 | B1 | * | 4/2001 | Brady et al. ............. 340/572.7 |
| 6,496,113 | B2 | * | 12/2002 | Lee et al. ................. 340/572.7 |
| 6,501,430 | B1 | * | 12/2002 | Esselink ..................... 343/718 |
| 7,199,718 | B2 | * | 4/2007 | Kikuchi et al. ........... 340/572.8 |
| 7,205,898 | B2 | * | 4/2007 | Dixon et al. ............. 340/572.1 |
| 7,209,042 | B2 | * | 4/2007 | Martin et al. ............ 340/572.8 |
| 7,225,992 | B2 | * | 6/2007 | Forster ....................... 235/492 |
| 7,374,102 | B2 | * | 5/2008 | Arnold et al. ............... 235/492 |
| 2002/0125997 | A1 | * | 9/2002 | Kashi et al. ............. 340/10.52 |
| 2003/0156033 | A1 | * | 8/2003 | Savage et al. ............ 340/572.8 |
| 2004/0203185 | A1 | * | 10/2004 | Kerr et al. ..................... 438/106 |
| 2005/0155508 | A1 | * | 7/2005 | Vaidyanathan et al. ...... 101/489 |

* cited by examiner

Primary Examiner—Benjamin C Lee
Assistant Examiner—Sigmund Tang
(74) Attorney, Agent, or Firm—Sughrue Mion, PLLC (57) ABSTRACT

The present invention provides IC tags which can not easily be broken nor give any hazard to human health, which enables minimization of aborted tags, shortening of time required for deletion of recorded data, minimization of sanitary and environmental problems, and reuse of tags to substantially reduce the cost for a management system. A metal antenna and an IC chip are coupled to and integrated with each other to form an IC chip-mounted body. Then, the IC chip-mounted body is covered with ceramic cladding members to form an IC tag. The metal antenna is formed by winding a metal wire into a coil form. A ceramic filler is used for coupling the ceramic cladding members to each other and also tightly securing the IC chip-mounted body to the ceramic cladding members.

9 Claims, 9 Drawing Sheets

IC TAG

BACKGROUND OF THE INVENTION

1. Field of the Invention

The present invention relates to IC tags (RFID tags) used for management of various types of information data on live stocks such as cows, pigs, and domestic fowls; pet animals such as dogs, cats, and birds; machines such as pachinko machines and copying machines; and other products and articles.

2. Description of the Related Art

Recently, IC tags (RFID (Radio Frequency Identification) tags) are widely used for management of various types of information data on live stocks such as cows, pigs, and domestic fowls; pet animals such as dogs, cats, and birds; machines such as pachinko machines and copying machines; and other products and articles, and the IC tag generally includes a micro IC (Integrated Circuit) chip and an antenna for radio communication, which are integrated with each other and covered with cladding material.

For instance, in a live stock management system using IC tags, an IC tag is attached to a proper potion of a body of each live stock, and information data such as a birth date, a body weight, information on foods given to the animal, and information on medical history are recorded in the IC tag, so that each animal can be managed from its birth date, during breeding, and until butchering by reading the recorded data with a reader/writer according to the necessity.

Figure 8A:
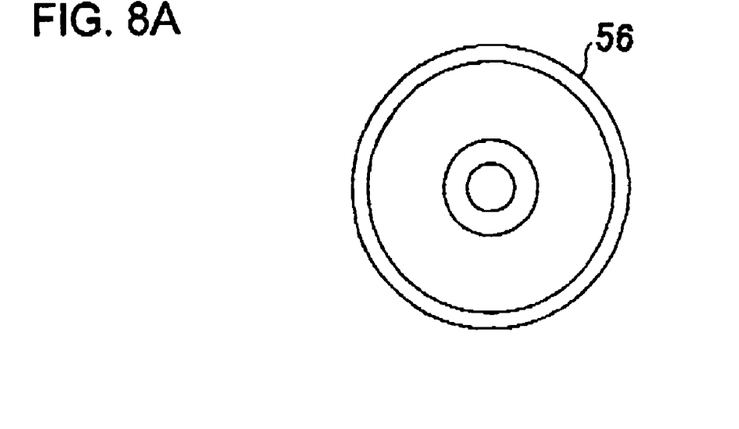
FIG. 8A is a flat view illustrating a cladding member in the lower side.
Figure 8B:
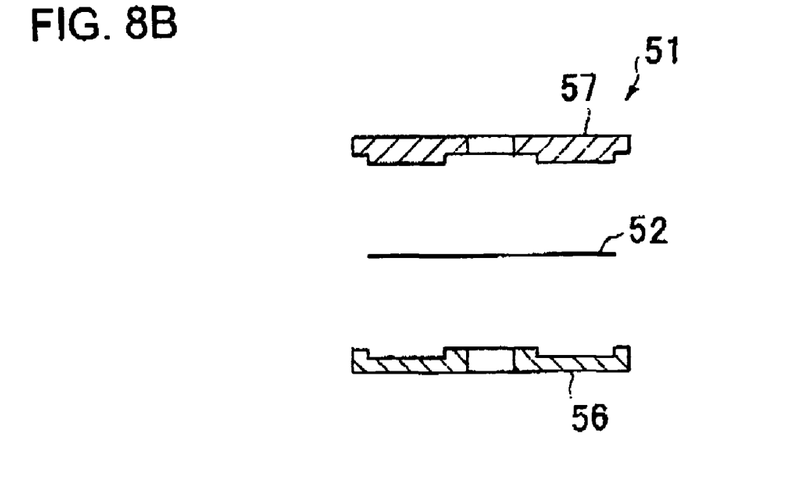
FIG. 8B is a side cross-sectional view illustrating the members in the separated state.
Figure 8C:
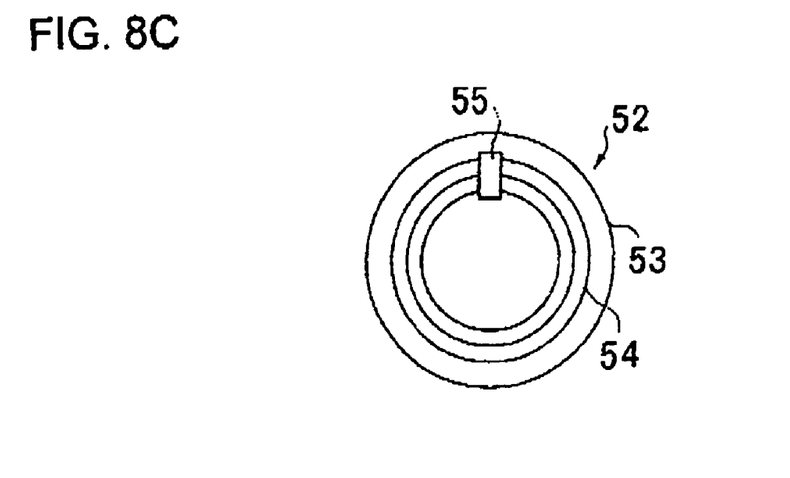
FIG. 8C is a flat view illustrating an IC chip-mounted body formed by integrating a coil-formed antenna and an IC chip with each other on a synthetic resin sheet.
Figure 9A:
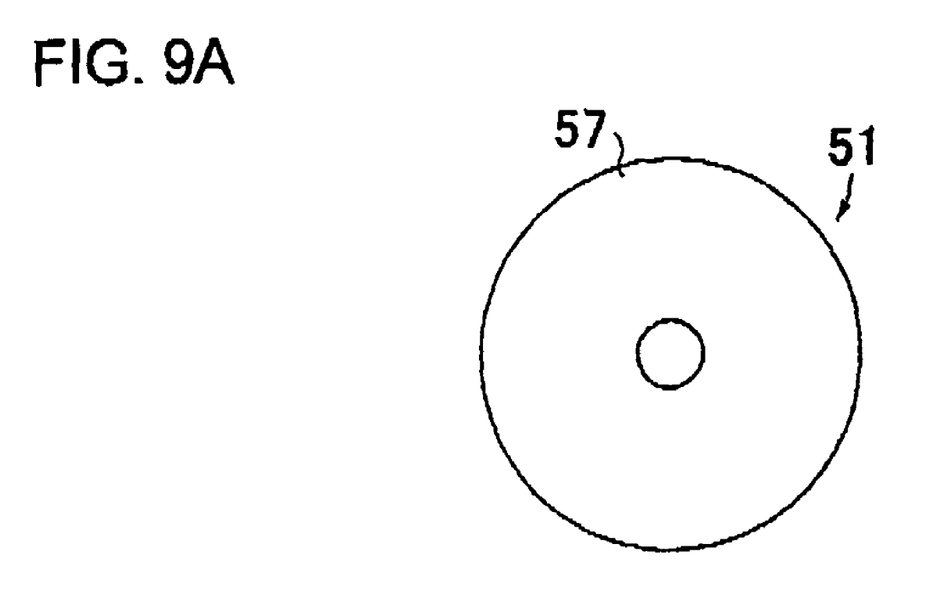
FIG. 9A is a flat view illustrating the IC tag shown in FIG. 8.
Figure 9B:
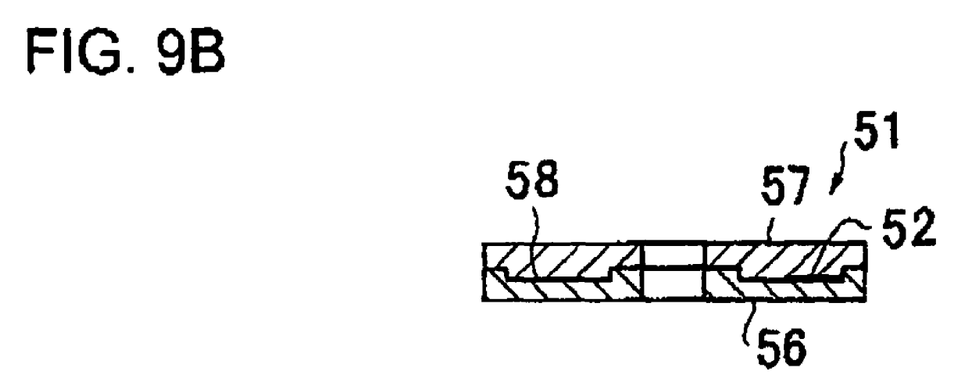
FIG. 9B is a side cross-sectional view showing the IC tag.

In the conventional technology, for enabling easy treatment and also for preventing damages caused by an external force loaded thereto, an antenna 54 having a metal-film pattern made of a conductive metal such as copper, aluminum or the like is formed on a synthetic resin sheet 53 as shown in FIG. 8C, and then an IC chip 55 is connected to and integrated with this antenna 54 for configuring a film-like IC chip-mounted body 52. Then, the IC chip-mounted body 52 is covered with synthetic resin cladding members 56, 57, as shown in FIG. 8B, to form an IC tag 51 as shown in FIG. 9 (Refer to, for instance, Patent document 1).

Furthermore, a synthetic resin-based filler 58 is used for coupling the synthetic resin cladding members 56, 57 and also for securing the IC chip-mounted body 52 to the synthetic resin cladding members 56, 57 tightly.

When the IC tags 51 as described above are used, for instance, in a live stock management system for pigs, the IC tag 51 is attached to a ear or other proper portion of a body of each pig for management of the anal.

Patent Document 1: Japanese Patent Laid-Open Publication No. 2002-7991

However, as the conventional type of IC tags 51 are coated with synthetic resin cladding members 56, 57, the mechanical strength is relatively low, and when a pig bites the IC tag, the IC tag is easily broken, which disadvantageously makes it impossible to manage the animal. Furthermore, when the pig eats pieces of the broken IC tag, the broken pieces reside in the meat, which may cause a hazard for human health.

In addition, after the animal is sacrificed to obtain the meat, it is necessary to delete the recorded information data from the IC tag 51 and abort the tag, and a substantially long period of time is required for deleting the recorded data from a large number of IC tags. In addition, the IC tag 51 includes an IC chip 55, an antenna 54 made of copper or aluminum, cladding members 56, 57 made of synthetic resin, and synthetic resin-based filler 58, and abortion of a large number of IC tag 51 including organic materials is not desirable for protection of environment, and there is the strong need for solving this problem.

Reuse of the IC tag 51 is conceivable, but bacteria easily grow proliferously in the synthetic resin cladding members 56, 57, which sometimes causes diseases in pigs and is not desirable also from the viewpoint of sanitary. Even if the IC tags 51 are sterilized by boiling or with a chemical agent, the synthetic resin cladding members 56, 57 are low in the heat resistance and in the chemical resistance, so that reuse of the IC tags is difficult.

Further, about five years are required for growing cows, while life of IC tags 51 coated with the synthetic resin cladding members 56 57 is shorter than five years and comes to the end before the cows are sacrificed for meat processing, so that the durability is limited, which also makes reuse of the IC tags difficult.

Possibility of use of metal for cladding members was studied, because the mechanical strength of metal is high, but when a conductive member is present near the IC chip-mounted body 52, electric waves used for supplying electric power to the IC tag and used for transmitting and receiving data are disturbed or shielded, so that functions of the IC tags are lost. To prevent this problem, generally the IC tag is installed at a position far from a conductive member.

When IC tags are stored, transported, or used, the IC tags are often covered with a vessel or the like for protection from a stress or a shock loaded to the IC tags from the outside, but a conductive material causing a communication barrier can not be used as a material for the vessel when communication between the IC tag and a reader/writer terminal placed outside the vessel is required, and generally the IC tag is placed within a vessel made of a nonconductive material such as plastics.

For the reasons as described above, the conventional type of IC tags 51 can hardly be reused and are aborted, so that a huge amount of cost is required for a live stock management system using the IC tags 51.

In addition, the conventional type of IC tags 51 has low mechanical strength and are weak against such temperature conditions as high temperature or low temperature, and when humidity is high, the IC chip 55 is degraded due to moisture, which disables use of the IC chips 55 in many applications.

SUMMARY OF THE INVENTION

The present invention was made to solve the problems in the conventional technology as described above, and an object of the present invention is to provide IC tags which are not easily broken to cause troubles in the management nor cause any hazard to human health, which can contribute to reduction of aborted IC tags to minimize negative influences over the global environment, which require only a short period of time for deletion of data stored therein and minimize environmental and sanitary problems, and also which enables reuse thereof to enable substantial reduction of cost for the management system.

Another object of the present invention is to provide optimal IC tags which has high mechanical strength and are not broken even when dropped or treaded, and also which can be adhered on articles and products not only for data management, but also in such applications as game coins making it possible to write data such as playable times, points and the like for games in and read the stored data from the IC chip 55.

Another object of the present invention is to provide IC tags which can sufficiently be used in severe temperature conditions such as extremely high temperature or extremely low temperature causing damages to and disabling use of the conventional types of IC tags. Still another object of the present invention is to provide IC tags made of a ceramic materials or a filler based on a ceramic material having low hygroscopic property and low moisture permeability and also having high chemical resistance which can sufficiently be used without the performance not degraded even under such environmental conditions as high temperature and high humidity or in such applications in which the IC tags are immersed in water, or in the presence of alkali, acids, solvents, and corrosive gasses. The conventional types of IC tags coated with synthetic resin cladding members can not be used under the conditions described above.

Another object of the present invention is to provide IC tags based on the structure in which the IC chip 55 easily affected by heat is surrounded and shielded by a heat-insulating material such as mica or glass fiber to provide higher heat resistance.

Another object of the present invention is to provide IC tags having the excellent characteristics as described above and capable of being sterilized at a high temperature or with a germicidal agent and also making it possible to clean off contamination on a surface thereof with a cleaner, an oxidizing agent, or a reducing agent.

Another object of the present invention is to provide IC tags allowing reproduction of information stored therein by displaying information enabling identification of each IC tag with characters, bar code, two-dimensional code or the like as ID code provided on a surface thereof in preparation for a case where information recorded in the IC tag can not be read out.

Another object of the present invention is to provide IC tags based on a combination of a specific cladding member and a material for the antenna and ensuring a communication coverage distance longer than that enabled by the conventional types of IC tags, and the IC tags can overcome the defect of IC tags having smaller external dimensions as required in some applications that dimensions of an internal antenna 54 are smaller and the communication coverage distance is shorter than that provided by IC tags having the standard sizes.

To achieve the objectives described above, in the present invention, an antenna having a pattern of a conductive metal film pattern is formed on a synthetic resin sheet, and an IC chip is coupled to this antenna to form an IC chip-mounted body. Alternatively, an antenna is formed by winding a conductive metal wire into a coil form and then an IC chip is coupled to the antenna to form an IC chip-mounting body. Then the IC chip-mounted body is covered with. a ceramic cladding member to provide an IC tag.

The metal antenna formed on a synthetic resin sheet may be employed as an IC chip-mounted body to be used in the present invention, but the metal antenna formed by winding a metal wire into a coil form is optimal for achieving the objectives described above, because this type of metal antenna can easily be integrated with an IC chip and also can easily be treated, and furthermore because the type of metal antenna enables minimization of a shielding volume and has higher heat resistance which enables improvement in resistance against a high temperature or a low temperature.

In addition, it is preferable to use a ceramic filler material for tightly securing an IC chip-mounted body formed by integrating a metal antenna and an IC chip to the ceramic cladding member.

BRIEF DESCRIPTIONS OF THE DRAWINGS

FIGS. 1A thru 1C are views schematically showing members used for forming an IC tag according to an embodiment of the present invention.

FIG. 2A is a flat view illustrating the IC tag shown in FIG. 1, while

FIGS. 3A thru 3C are views schematically showing members used for forming an IC tag according to another embodiment of the present invention.

FIG. 4A is a flat view illustrating the IC tag shown in FIG. 3, while

FIGS. 5A thru 5C are views schematically showing members used for forming an IC tag according to another embodiment of the present invention.

FIG. 6A is a flat view illustrating the IC tag shown in FIG. 5, while

FIG. 8A thru 8C are views schematically showing members used for forming an IC tag based on the conventional technology.

DESCRIPTION OF SIGNS

1: IC tag
2: IC chip-mounted body
3: Antenna
4: IC chip
5, 6: Ceramic cladding member
7: Ceramic filler
21: IC tag
25: Ceramic cladding member
31: IC tag
32: IC chip-mounted body
33: Synthetic resin sheet
34: Antenna
35: IC chip
41: ID code

DETAILED DESCRIPTION OF THE PREFERRED EMBODIMENTS

Preferred embodiments of the present invention are described below with reference to the related drawings.

Figure 1A:
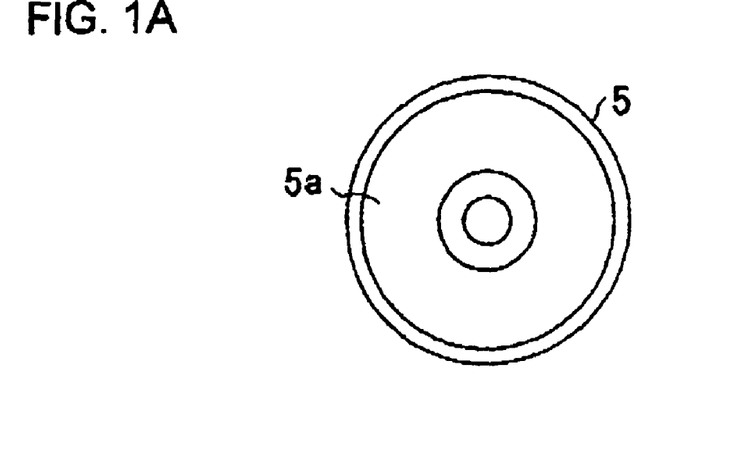
FIG. 1A is a flat view illustrating a cladding member in the lower side.
Figure 1B:
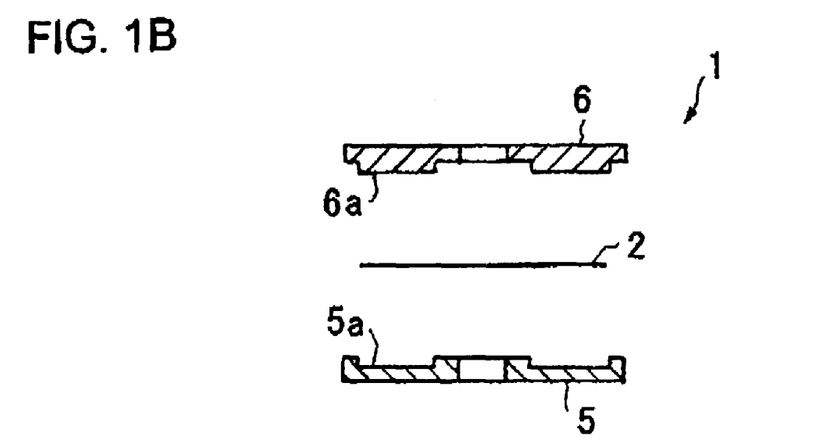
FIG. 1B is a side cross-sectional view illustrating the members in the separated state.
Figure 1C:
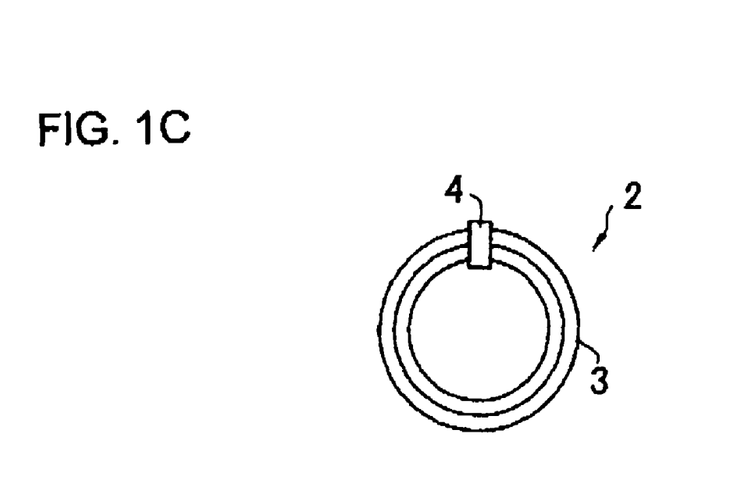
FIG. 1C is a flat view illustrating an IC chip-mounted body formed by integrating a coil-formed antenna and an IC chip with each other.
Figure 2A:
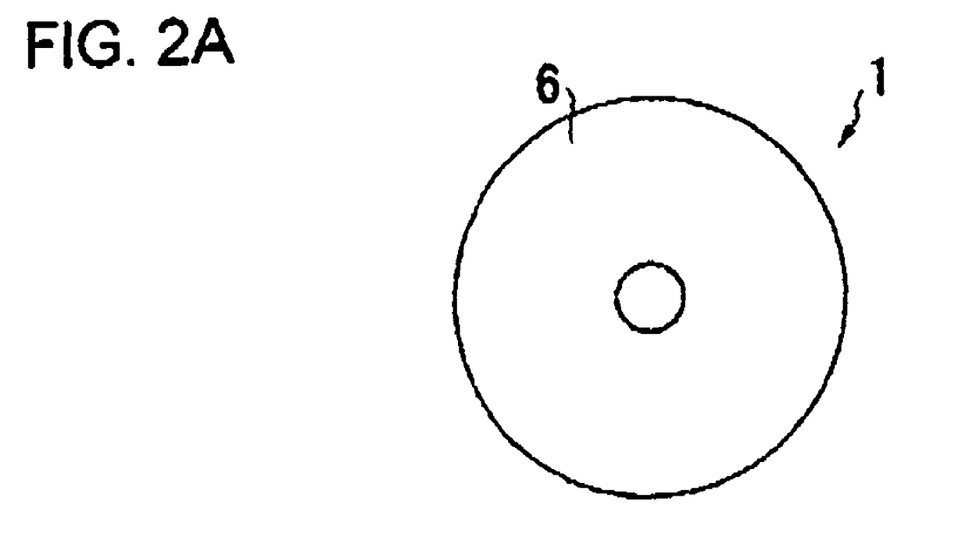
Figure 2B:
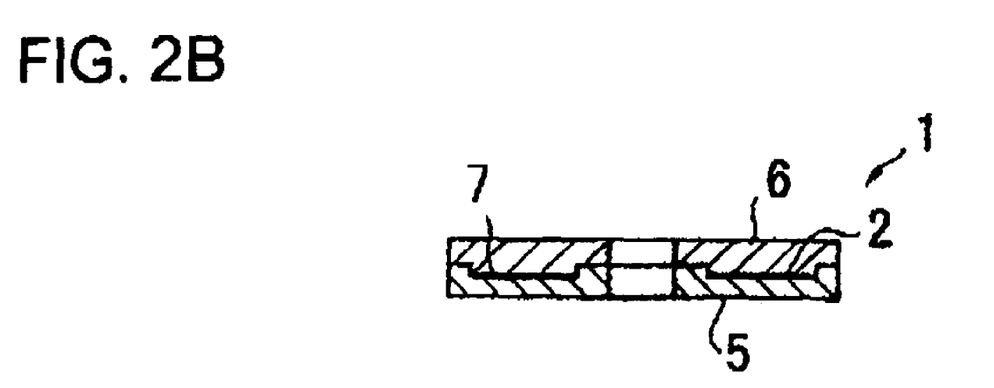
FIG. 2B is a side cross-sectional view illustrating the IC tag.

An IC tag I according to an embodiment of the present invention includes, as shown in FIG. 1 and FIG. 2, an IC chip-mounted body 2 by coupling and integrating an antenna 3 formed by winding a conductive metal wire into a coil form and an IC chip 4 with each other, ceramic cladding members 5, 6, and a ceramic filler 7.

The antenna 3 is formed by winding a conductive metal wire made of copper, aluminum, or the like into a coil form.

Because of the structure as described above, a projected area of the IC chip-mounted body 2 is smaller as compared to that of an IC chip-mounted body 52 formed by providing a metal antenna 54 and an IC chip 55 on a synthetic metal sheet 53, and the IC chip-mounted body 52 includes only the metal antenna 3 and the IC chip 4 integrated with each other, and the form can be preserved for a long time.

The ceramic cladding members 5, 6 are manufactured by sintering a ceramic material such as alumina (Al203), zirconia (Zr02.Si02), or silicon nitride (Si3.N4), and the upper and lower cladding members 5,6 engage with each other as shown in FIG. 1. A recesses portion 5a is formed in the lower cladding member 5 for accommodating therein the IC chip-mounted body 2, while a projecting portion 6a engaged in the recessed portion Sa is provided in the upper cladding member 6.

Such a ceramic cement material as alumina cement, or portland cement is used as the ceramic filler 7.

Because of the feature, it is possible to tightly secure the ceramic cladding members 5, 6 to each other and also to tightly secure the IC chip-mounted body 2 formed by coupling and integrating the metal antenna 3 and the IC chip 4 with each other to the ceramic cladding members 5, 6.

The IC tag 1 according to the present invention has the configuration as described above and is manufactured as described below.

At first, as shown in FIG. 1C, the IC chip 4 is coupled to both edges of the metal antenna 3 formed by winding a metal wire into a coil form to integrate the metal antenna 3 and the IC chip 4 with each other for forming the IC chip-mounted body 2.

Then, as shown in FIG. 1B, the IC chip-mounted body 2 formed by coupling and integrating the metal antenna 3 and the IC chip 4 with each other is positioned in the recessed portion 5a of the lower ceramic cladding member 5.

On the other hand, the ceramic filler 7 is sufficiently applied to an entire bottom surface of the upper ceramic member 6 for adhesion.

Then, the ceramic cladding member 6 is set from upper, and as shown in FIG. 2, the projecting portion 6a of the ceramic claddingmember 6 is engaged in the recessed portion 5a of the ceramic cladding member 5 to completely integrate the two cladding members 5, 6 for forming an IC tag 1.

Figure 3A:
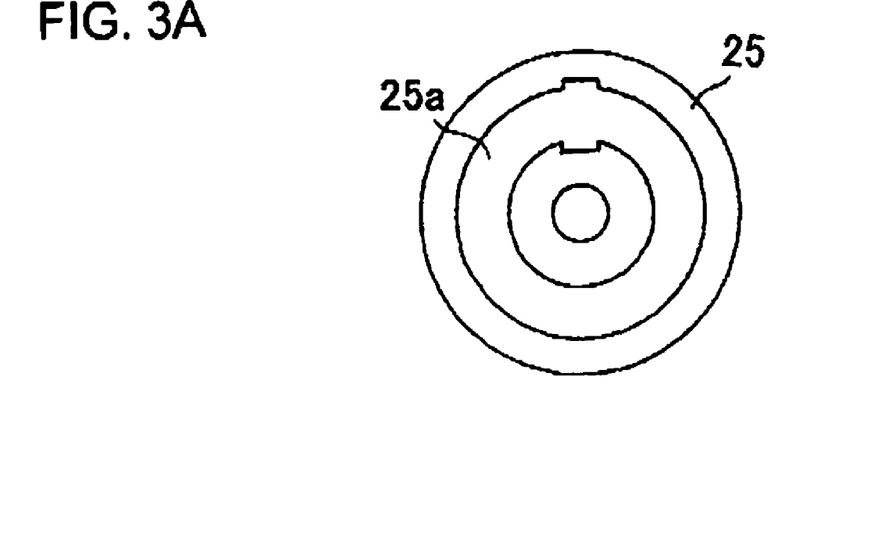
FIG. 3A is a flat view illustrating a ceramic cladding member.
Figure 3B:
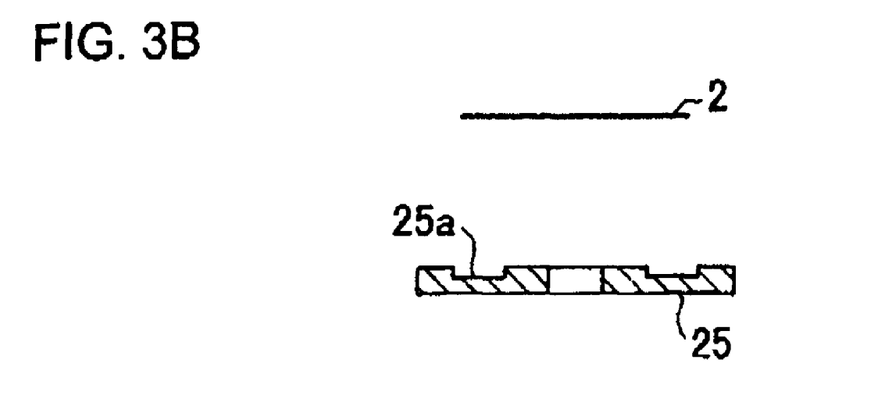
FIG. 3B is a side cross-sectional view showing the members in the separated state.
Figure 3C:
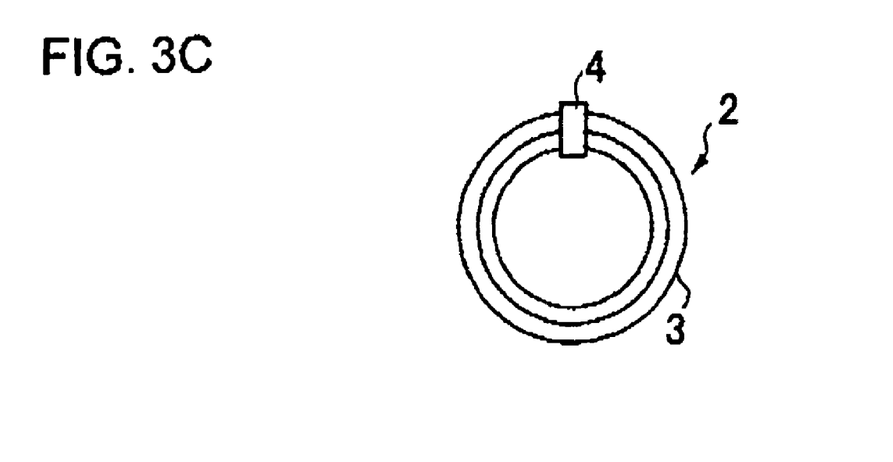
FIG. 3C is a flat view illustrating an IC chip-mounted body formed by integrating a coil-formed antenna and an IC chip with each other.
Figure 4A:
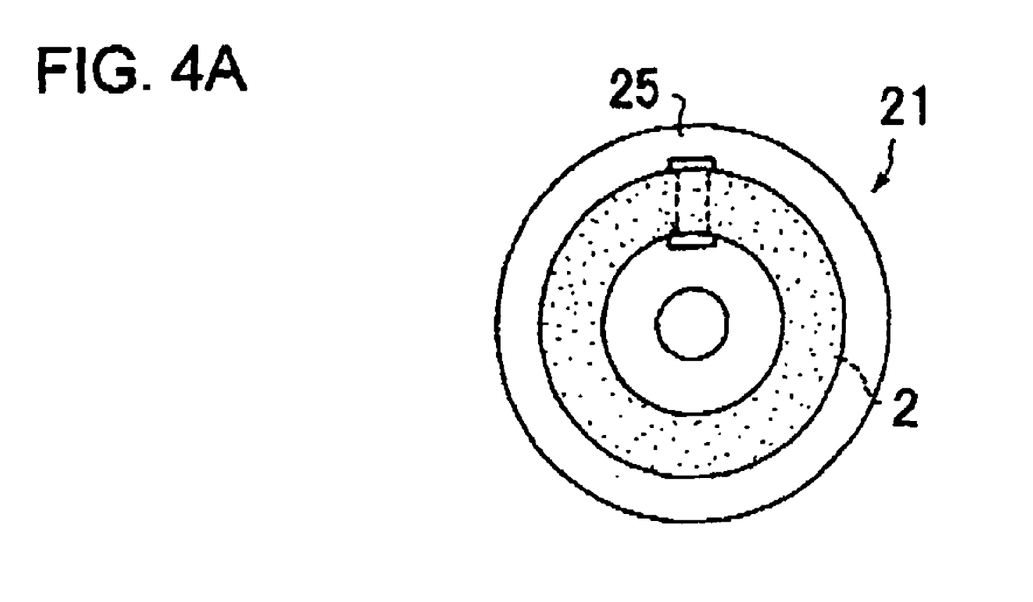
Figure 4B:
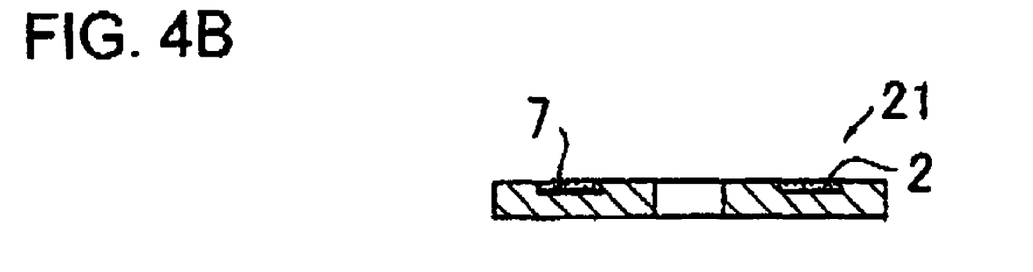
FIG. 4B is a side cross-sectional view illustrating the IC tag.

An IC tag 21 according to another embodiment of the present invention includes, as shown in FIG. 3 and FIG. 4, the IC chip-mounted body 2 formed by coupling and integrating the antenna 3 formed by winding a conductive metal wire into a coil form and the IC chip 4 with each other, a ceramic cladding member 25, and a ceramic filler 7.

The IC chip-mounted body 2 and the ceramic filler 7 are made of the same material and also has the same configuration as the IC tag 1 according to the embodiment of the present invention described above.

The ceramic cladding members 25 is manufactured by sintering a ceramic material such as alumina (Al203), zirconia (Zr02.Si02), or silicon nitride (Si3N4) like the upper and lower cladding members 5,6, and as shown in FIG. 3, a recessed portion 25a for accommodating therein the IC chip-mounted body 2 is formed on the cladding member 25.

The IC tag 21 according to the present invention has the configuration as described above, and at first, as shown in FIG. 3B, the IC chip-mounted body 2 formed by coupling and integrating the metal antenna 3 and the IC chip 4 with each other is positioned in the recessed portion 25a of the ceramic cladding member 25.

Then, as shown in FIG. 4, the ceramic filler 7 is filled in the recessed portion 25a of the ceramic cladding member 25 and the IC chip-mounted body 2 is completely shielded in the ceramic filler 7 to configure the IC tag 21.

With the IC tag 21 having the configuration as described above, it is possible to provide IC tags thinner and cheaper as compared to the IC tag 1.

Figure 5A:
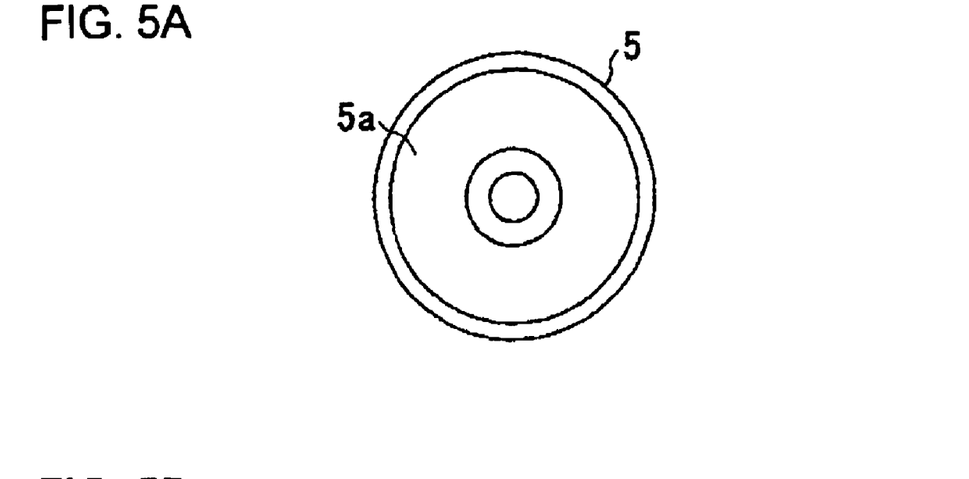
FIG. 5A is a flat view illustrating a cladding member in the lower side.
Figure 5B:
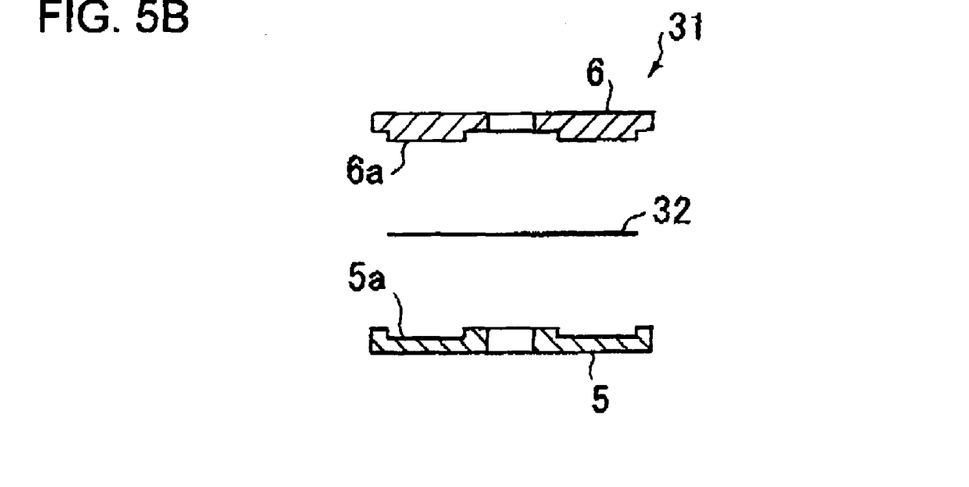
FIG. 5B is a side cross-sectional view illustrating the members in the separated state.
Figure 5C:
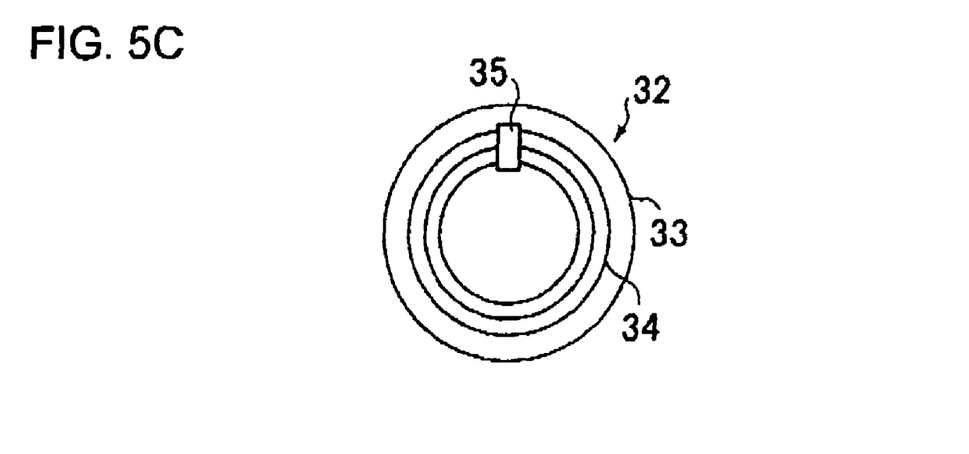
FIG. 5C is a flat view illustrating an IC chip-mounted body formed by integrating a coil-formed antenna and an IC chip with each other on a synthetic resin sheet.

As shown in FIG. 5, an IC tag 31 according to still another embodiment of the present invention includes a film-like IC chip-mounted body 32 formed by coupling and integrating an antenna 34 having a pattern of a conductive metal film provided on a synthetic resin sheet 33 and an IC chip 35 with each other, ceramic cladding members 5, 6, and a ceramic filler 7.

The film-like IC chip-mounted body 32 has the same configuration as that of the film-like IC chip-mounted body 52 in the conventional type of IC tag 51.

The ceramic cladding members 5, 6 and the ceramic filler 7 are based on the same materials and have the same configurations as those of the IC tag 1 according to one embodiment of the present invention.

The IC tag 31 according to the present invention has the configuration as described above, and can be configured like the IC tag 51 based on the conventional technology.

Experiment 1

Characteristics of the IC tag 1, in which alumina ($Al_2O_3$) is employed as a material for the ceramic cladding members 5, 6, is described below.

Physical properties of alumina ($Al_2O_3$) are as shown in Table 1.

TABLE 1

| | |
|---|---|
| Purity [%] | 96 |
| Balk specific gravity [g/cm$^3$] | 3.8 |
| Temperature for safe use [° C.] | 1500 |
| Coefficient of thermal conductivity (20° C.) [W/m · K] | 21 |
| Vickers hardness(Load: 4.9N) [MPa] | 155 |
| Flexural strength [MPa] | 330 |

When the configuration, in which the IC chip-mounted body 2 is shielded by the ceramic cladding members 5, 6, is employed, the thermal capacity of the IC tag 1 as a whole increases. A coefficient of thermal conductivity of alumina is about 20 [W/m·lc], which is about ⅕ of that of iron, and therefore, when the IC tag 1 is placed in an atmosphere at a high temperature, a temperature rise rate of the IC chip 4 set inside the IC tag 1 becomes lower as compared with that of the IC tag 51 based on the conventional technology.

As a result, even when the IC tag is exposed to a temperature higher than that allowable for the IC chip 4, the IC tag 1 can work normally on the condition that the exposure time is not so long. A result of a heat resistance test actually conducted is as shown in Table 2.

TABLE 2

| | Temperature | | | |
|---|---|---|---|---|
| Time | 125° C. | 150° C. | 175° C. | 200° C. |
| 30 min. | Successful | Successful | Successful | Successful |
| 1 hour | Successful | Successful | Successful | Successful |
| 2 hours | Successful | Successful | Successful | Successful |
| 3 hours | Successful | Successful | Successful | Not tested |
| 6 hours | Not tested | Not tested | Successful | Not tested |
| 24 hours | Successful | Not tested | Not tested | Not tested |
| 40 hours | Not tested | Successful | Not tested | Not tested |
| 72 hours | Successful | Not tested | Not tested | Not tested |

An allowable temperature to the IC chip 4 used in this experiment is in the range from −40 to +85° C. when the IC chip 4 works, and in the range from −65 to +150° C. when the IC chip 4 does not work.

For the IC tag 1 used in the atmosphere at the high temperature as described above, solder welded at or having the melting point of +250° C. or more is used for coupling the antenna 3 to the IC chip 4.

Even in the case of the IC tag 1 welded with solder having a melting point in the ordinary range, because a coupling section between the antenna 3 and the IC chip 4 is surrounded and covered with the ceramic filler 7, even when a temperature of the coupling section rises to a temperature higher than a melting point of the solder and the solder is melted, the coupled components are never separated off from each other, and also the solder never leaks out, so that the normal coupling state is preserved, so that the IC tag I always functions normally.

The IC tag 1 using therein the antenna 3 formed by winding a metal wire into a coil form is preferable as the IC tag used in an atmosphere at a high temperature.

However, also in a case of the IC tag 31 based on the film-like IC chip-mounted body 32 including the metal antenna 34 formed on the ordinary synthetic resin sheet 33 and the IC chip 35 coupled to the metal antenna 34, for the same reasons as described above, temperature ride in the internal IC chip 35 is suppressed, so that the IC tag 31 can normally work even in an atmosphere having a temperature higher than a normal operating temperature for the IC chip 35.

Especially, because the IC chip-mounted body 32 is completely surrounded by the ceramic cladding members 5, 6 and the ceramic filler 7, and therefore the phenomenon that the synthetic resin sheet 33 constituting the IC chip-mounted body 32 deforms due to the thermal effect can completely be suppressed.

Experiment 21

Figure 7:
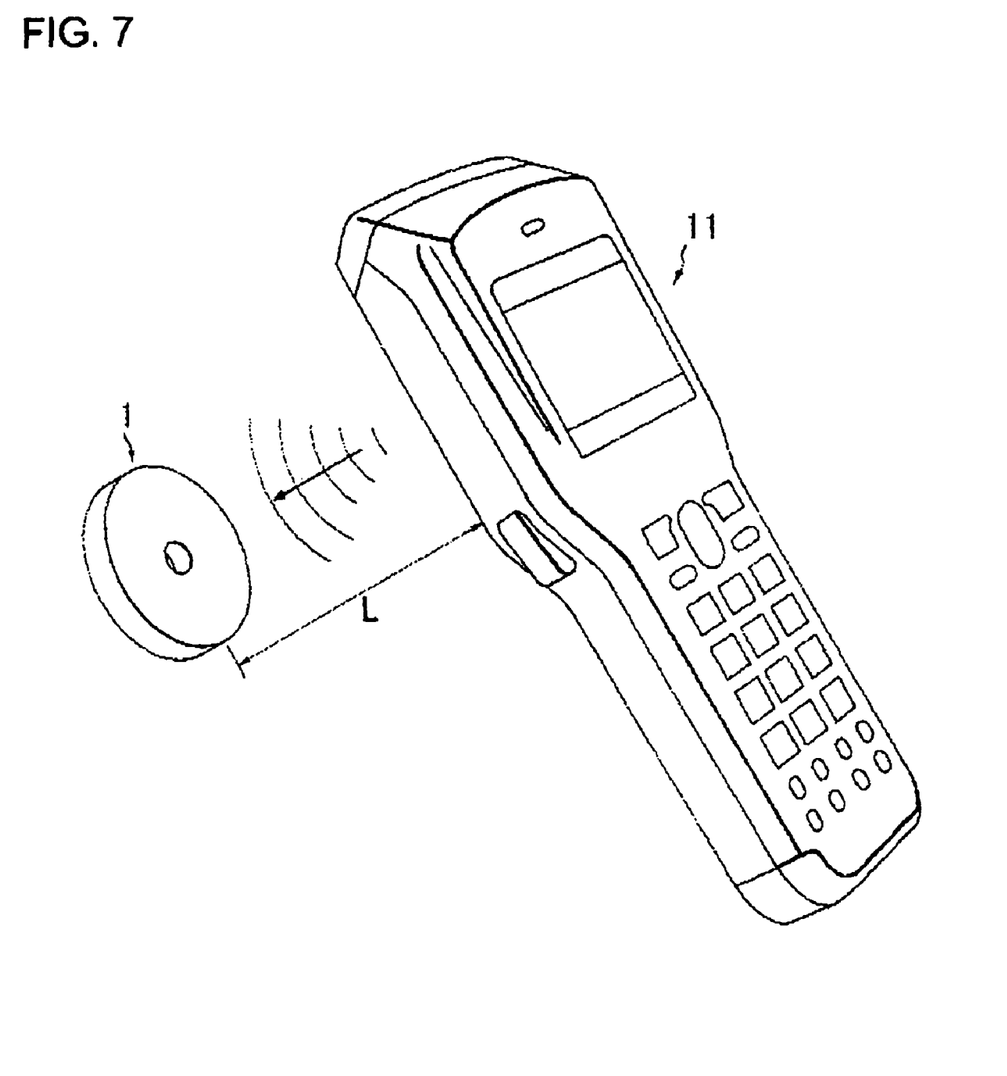
FIG. 7 is an explanatory view illustrating the state in which information recorded in the IC tag according to the present invention is read with a reader/writer.

It is confirmed that, in the IC tags 1, 21, 31 covered with the ceramic cladding members 5, 6, 25, the maximum coverage distance L between the IC tags 1, 21, 31 and the reader/writer 11 becomes larger as compared to that provided when the IC tag 51 based on the conventional technology is used.

The effect becomes most remarkable when, in the IC tag 31 based on the IC chip-mounted body 32 including the antenna 34 formed on the synthetic resin sheet 33, aluminum is used as a material for the antenna 34 and an alumina-based material is used for the ceramic cladding members 5, 6.

As shown in Table 3, the effect is most remarkable in the IC tag 31 having the antenna 34 with the size of 14 mm (inner diameter)×40 mm (outer diameter), and the maximum coverage distance L becomes larger by about 30% as compared to that provided by the conventional type of IC tag 51.

TABLE 3

| | Coverage distance | (mm) | |
|---|---|---|---|
| Antenna size [mm] | Covered with ceramics | Coated with synthetic resin | Change rate |
| 14 × 36 | 38 | 30 | +8 |
| 14 ×. 40 | 48.7 | 37.3 | +11.4 |
| 16 × 30 | 55 | 47 | +8 |
| 23 × 39 | 74 | 71.5 | +2.5 |

In the IC tags 1, 21, and 31 according to the present invention, ceramics, which is an inorganic material, is used as a raw material for the cladding members 5, 6, 25, and therefore, even when bacteria or the like are deposited on surfaces of the IC tags 1, 21, 31, proliferation of the bacteria or the like never occurs.

When the surfaces are contaminated, proliferation of bacteria or the like may occur, but by applying an antibacterial material such as titanium oxide (Ti02) on the surface, proliferation of bacteria or the like can be prevented.

Furthermore, the ceramic cladding members are not affected by high temperature nor by a bactericidal substance, and therefore the surface can be preserved in the sanitary condition by performing various types of processing for bactericidal or sterilizing effects.

The IC tags 1, 21, 31 according to the present invention record information therein, and electric waves are used for reading out the information, and if any failure disabling reading out of the recorded data should occur in the IC tags 1, 21, 31, there is no means for reading out the information recorded therein at all.

Figure 6A:
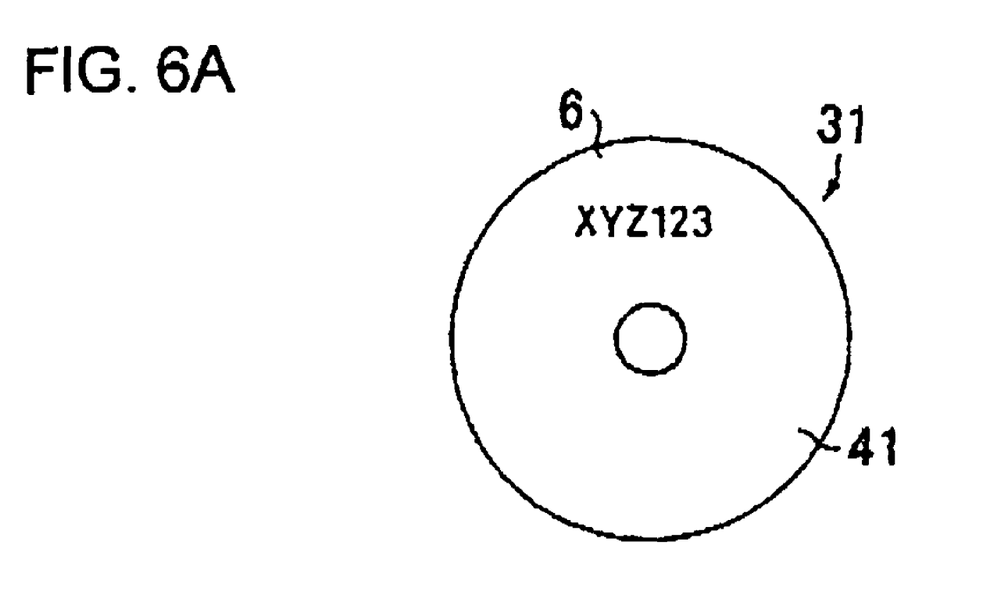
Figure 6B:
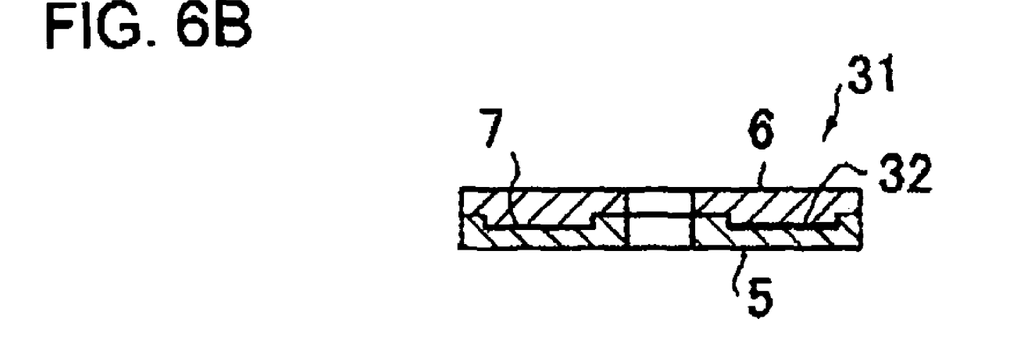
FIG. 6B is a side cross-sectional view illustrating the IC tag.

To prepare for the event as described above, it is preferable to display, as shown in FIG. 6, ID code 41 corresponding to the information recorded therein on surfaces of the IC tags 1, 21, 31.

Any code including alphanumerical characters, bar code, and two-dimensional code may be used as the IC code 41, and various materials such as ink may be used for displaying the recorded information, but when the abrasion resistance and the chemical resistance are taken into consideration, it is not preferable to directly engrave the IC code 41 on the surfaces of the ceramic cladding members 5, 6, 25.

If a failure occurs in the IC tags 1, 21, 31, the IC code 41 displayed on the surface is read visually or with a reader, and the information recorded in the IC tags 1, 21, 31 is verified to a database on a server based on the information read as described above, or is checked by referring to a ledger for management.

The identified information is written in new IC tags 1, 21, 31, and the IC code 41 is displayed on surfaces of the ceramic cladding members 5, 6, 25 for the new IC tags 1, 21, 31 with the database or the ledger for management updated, thus data recovery being completed.

As described above, the IC tags 1, 21, 31 according to the present invention are formed by integrating the metallic antenna 3, 34 with the IC chips 4, 35 to form the IC chip-mounted bodies 2, 32 and covering the IC chip-mounted bodies 2, 32 with the ceramic cladding members 5, 6, 25, and because hardness of the cladding members 5, 6, 25 is very high, the IC tags 1, 21, 31 are not easily broken even when bitten by pigs, so that a trouble in management does not occur.

Furthermore there is not the possibility that broken pieces of an IC tag are eaten by consumers and health is spoiled.

As described above, the IC tags 1, 21, 31 according to the present invention are not easily broken, and therefore, a volume of aborted tags can be minimized by repetitively using the tags, which also contributes to minimization of time required for deletion of recorded data as well as to minimization of negative effects over the global environment.

The ceramic cladding members 5, 6, 25 have the antibacterial property, so that any sanitary problem causing diseases in pigs never occurs. In addition, the ceramic cladding members 5, 6, 25 are excellent in the heat resistance and in the chemical resistance, so that the IC tags 1, 21, 31 can easily be sterilized by boiling or with a chemical substance, which facilitates reuse of the IC tags.

Because the IC tags 1, 21, 31 according to the present invention can be reused again and again, so that the cost required for a live stock management system using IC tags can substantially be reduced as compared to that required in the system using the disposable IC tags 51 based on the conventional technology.

Even when the IC tags 1, 21, 31 are finally aborted, because the ceramic cladding members 5, 6, 25, ceramic filler 7, and metal antennas 3, 34 are made of inorganic materials, a percentage of organic materials is extremely small, which is also desirable for conservation of the global environment.

The IC tags 1, 21, 31 according to the present invention can be used not only for management of various types of information data used in the live stock management system for growing animals such as cows, pigs, and fowls and concerning various types of machines and articles such as pachinko playing machines and copying machines, but also in applications requiring heat resistance and chemical resistance such as management of cloths and the like, for instance, in dry cleaning.

What is claimed is:

1. An IC tag comprising:
    an IC chip-mounted body formed with a metal antenna and an IC chip coupled to and integrated with each other,
    two ceramic cladding members, one of which has a recessed portion and the other of which has a projecting portion engaged in the recessed portion, whereby the IC chip-mounted body is placed in the recessed portion of the ceramic cladding member, and
    a ceramic filler applied to a surface of said ceramic cladding members and filled in the recessed portion of the ceramic cladding member so that the IC chip-mounted body is completely shielded in the ceramic filler, whereby the IC chip-mounted body is fixed in the recessed portion of the ceramic cladding member and covered entirely with the two ceramic cladding members.

2. The IC tag according to claim 1, wherein said metal antenna is formed by winding a metal wire rod into a coil form.

3. The IC tag according to claim 1, wherein said IC chip-mounted body is furthermore surrounded by a heat-insulating material.

4. The IC tag according to claim 1, wherein said metal antenna is made of aluminum, and said ceramic cladding member is made of alumina.

5. The IC tag according to claim 1, wherein a surface of said ceramic cladding member is pre-processed with an anti-biotic agent.

6. The IC tag according to claim 5, wherein a surface of said ceramic cladding member is coated with titanium oxide for the antibacterial effect.

7. The IC tag according to claim 1, wherein identifying code (ID code) enabling identification of information recorded in an IC chip is displayed on a surface of said ceramic cladding member.

8. The IC tag according to claim 7, wherein said ID code is two-dimensional code based on alphanumerical characters or bar code.

9. The IC tag according to claim 7 or 8, wherein said IC code is displayed with a laser.

* * * * *